Aug. 11, 1953     R. L. WALLACE, JR     2,648,773
POLYPHASE OSCILLATOR
Filed March 23, 1950

INVENTOR
R. L. WALLACE, JR.
BY
Walter M. Hill
ATTORNEY

Patented Aug. 11, 1953

2,648,773

UNITED STATES PATENT OFFICE 2,648,773

POLYPHASE OSCILLATOR

Robert L. Wallace, Jr., Plainfield, N. J., assignor to Bell Telephone Laboratories, Incorporated, New York, N. Y., a corporation of New York Application March 23, 1950, Serial No. 151,331

8 Claims. (Cl. 250—36)

This invention relates to electric oscillators and more particularly to variable frequency polyphase oscillators capable of delivering a plurality of output voltages variable in frequency and independently adjustable as to relative phase.

It is sometimes necessary to derive a plurality of voltages from a variable frequency source of alternating current, the several voltages being independently adjustable as to phase. When this is done by conventional means it is found that the phase varied as the frequency is changed so that while the voltages are independently adjustable as to phase they are not independent of frequency. This makes it necessary to perform the onerous task of readjusting the phase relationship whenever the frequency is varied.

It is the object of this invention to overcome the aforesaid difficulty by providing a variable frequency oscillator capable of producing a plurality of output voltages, each differing in phase from the others by any desired amount and wherein the phase differences between the voltages are independent of the frequency at which the oscillator is tuned.

The above object is achieved by this invention which provides in combination a variable frequency oscillator with frequency-determining elements, at least one phase adjusting network with variable elements, and a mechanical coupling means to mechanically link the frequency-determining elements with some of the phase-adjusting elements, whereby the frequency may be caused to vary without affecting the relative phase between the several output voltages.

The invention may be better understood by referring to the accompanying drawings in which.

Figure 1:
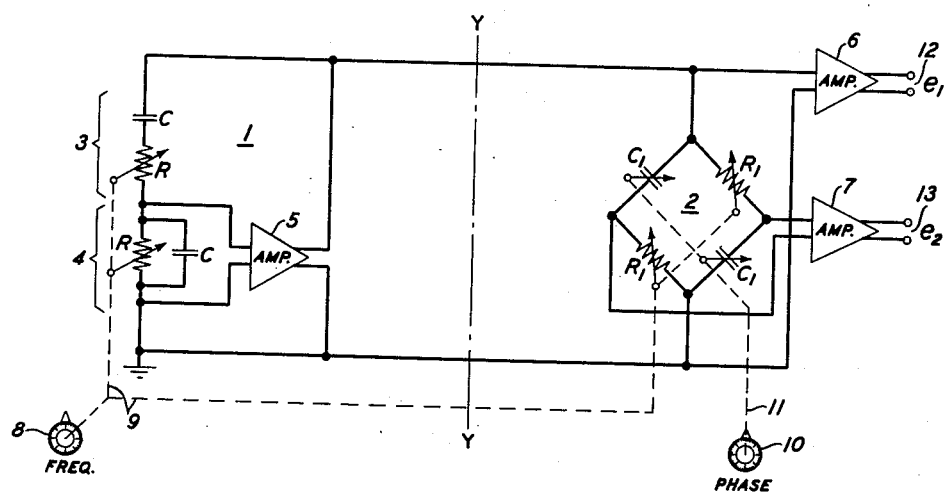
Fig. 1 illustrates one embodiment of the invention.

In Fig. 1 the invention is disclosed as comprising the combination of a variable frequency oscillator 1 and a phase shifting network 2 providing two output voltages $e_1$ and $e_2$. These voltages may differ in phase by an amount determined by the phase shifting network 2.

Oscillator 1 is of a conventional type, the frequency-determining elements of which comprise resistors and capacitors. There is a considerable variety of such oscillators known to this art. Alternatively, inductors may be employed instead of the capacitors shown in Fig. 1. The circuit specifically disclosed herein is of the same type as shown in the United States Patent 2,268,872 granted January 6, 1942, to W. R. Hewlett. Oscillators representative of the prior art which may be substituted for the one specifically disclosed herein are those shown by the United States Patent 1,442,781 granted January 16, 1923, to H. W. Nichols, United States Patent 2,024,489 granted December 17, 1935, to B. Van Der Pol et al., United States Patent 2,173,427 granted September 19, 1939, to H. H. Scott and the British Patent 497,148 to Willans, complete specification accepted December 12, 1938. It is characteristic of each of these oscillators that the frequency is determined by the reciprocal of the product of the resistance and capacitance employed as the frequency-determining elements. Mathematically this is expressed as follows:

$$\omega = \frac{K}{RC} \quad (1)$$

In the above expression $\omega$ is the angular frequency in radians per second, K is a constant determined by the particular design of the frequency-determining network, and R and C are the resistance and capacitance, respectively, of the resistors and capacitors as shown in Fig. 1 or the analogous elements in any of the prior patents mentioned above. For the particular oscillator chosen to illustrate this invention the constant K is equal to unity.

In the oscillator disclosed in Fig. 1, the frequency-determining elements comprise a series-connected resistor and capacitor 3 and an equal resistance and equal capacitance connected in parallel as at 4. As is well known, this type of circuit will maintain oscillations if the phase of the voltage fed back into the input circuit of amplifier 5 is regenerative and the gain of amplifier 5 is sufficient to overcome the loss through the phase-shifting frequency control network 3, 4. A useful output voltage $e_1$ is obtained from terminals 12 which voltage may be obtained directly from the output terminals of amplifier 5 or may be again amplified by a suitable amplifier 6.

The output voltage of amplifier 5 may also produce a second useful output voltage $e_2$ from terminals 13. This voltage, however, may be shifted in phase with respect to voltage $e_1$ by the phase shifter 2 and if the voltage is applied to a circuit of relatively low impedance it is preferable that a buffer amplifier 7 with high input impedance be employed. The characteristics of the phase shift network 2 are well known in the art and need not be described in detail. In the arrangement shown, the two capacitors have equal capacitances $C_1$ and the two resistors have equal resistances $R_1$. Either the two capacitors may be simultaneously varied to shift the phase of the output voltage or the two resistors may be varied, or both. In the present case, it is preferred to shift the phase of the voltage $e_2$ by varying the two capacitors simultaneously. The reason for also ganging the two resistors together with the frequency control dial 8 by way of mechanical linkage 9 is to permit the two resistors $R_1$ to be varied simultaneously with the frequency varying resistors R in the oscillator 1. As will be more apparent later, this arrangement prevents a shift of phase when the frequency is varied. The particular form of phase shift network here employed is of the same type as is shown in United States Patent 1,926,877 granted September 12, 1933, to W. A. Marrison and in United States Patent 1,954,396 granted April 10, 1934, to G. Viard. Assuming that amplifiers 6 and 7 are not used or that these two amplifiers have equal phase shift, the phase difference between voltages $e_1$ and $e_2$ is expressed by the following equation:

$$\theta = 2 \tan^{-1} \omega R_1 C_1 \qquad (2)$$

In the above expression $\theta$ is the angular phase difference between the two voltages, $\omega$ is the angular frequency as expressed by Equation 1 and $R_1$ and $C_1$ are the resistance and capacitance of the phase shift network 2. Now by substituting the value of the angular frequency from equation 1 into Equation 2 the following expression is obtained:

$$\theta = 2 \tan^{-1} K \cdot \frac{R_1 C_1}{RC} \qquad (3)$$

Referring to Fig. 1 it will be observed that, by way of mechanical linkage 9, the two equal resistors $R_1$ of the phase shift network 2 and the two equal resistors R in the oscillator are simultaneously varied by the frequency control dial 8. It is evident from Equation 3 that if the ratio of the resistance $R_1$ to the resistance R is kept constant there will be no shift in phase between the two output voltages $e_1$ and $e_2$ although the frequency is changed. This is a decided improvement and a convenience over the arrangements of the prior art in that heretofore when the frequency was varied the phase between the two output voltages also varied. This necessitated a time-consuming readjustment of the phase control associated with the phase shift network. It is equally evident that if the phase dial 10 of the phase control network is operated to simultaneously vary the two capacitors $C_1$ by way of mechanical linkage 11 the phase between the two output voltages will shift as shown by Equation 3.

While the invention has been described illustrating the frequency control as varying the resistances in the oscillator and in the phase shift network, it is now obvious that the capacitors could be similarly ganged to obtain the same kind of control. In this case, however, the phase control dial 10 would be coupled with the two resistors $R_1$ of the phase control network and the two resistors R in the oscillator would remain constant. It is also possible to couple the resistors R with capacitors $C_1$ to keep constant the ratio $$\frac{C_1}{R}$$

of Equation 3 to achieve the same end.

Figure 2:
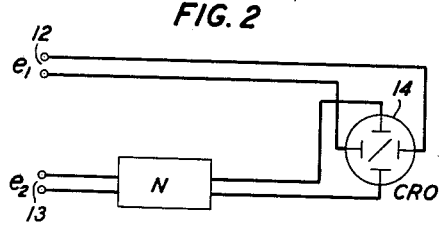
Figs. 2 and 3 illustrate typical uses of the invention of Fig. 1.

Fig. 2 illustrates an arrangement wherby the invention disclosed in Fig. 1 may be used to measure the phase shift in an amplifier or other transmission device generally denoted by the reference character N. The cathode ray oscilloscope 14 is arranged to have its horizontal deflector electrodes connected to terminals 12 of Fig. 1 so as to receive the voltage $e_1$. The vertical deflector electrodes of the oscilloscope 14 are connected to the output terminals of the network N while the input terminals of this network are connected to terminals 13 to receive the voltage $e_2$. The phase control dial 10 is adjusted until the oscilloscope pattern shows a single straight line indicating no phase difference between the two voltages as they are received by the oscilloscope. The phase control dial 10 will read directly the phase shift through the network or amplifier N. The entire phase-frequency characteristic is obtained by simply adjusting the frequency control dial 8 to a number of discrete frequency points throughout the range of interest and at each point the phase control dial 10 is readjusted until the straight line is obtained on the oscilloscope screen. The phase control dial 10 in each case reads the phase shift through the network or amplifier at that frequency. The convenience of the arrangement of this invention is clearly illustrated by this application of the invention when it is considered that the number of operations that would otherwise be required would be greatly increased.

Figure 3:
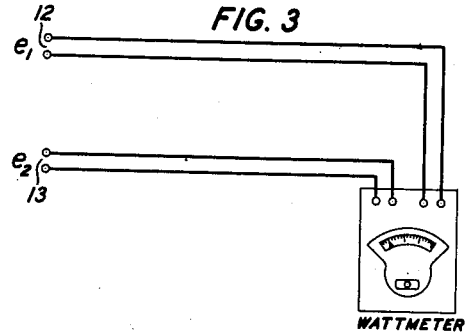

Another application of this invention is illustrated in Fig. 3 where the invention is applied to the problem of measuring the frequency-phase characteristic of a wattmeter. For example, the current terminals of the wattmeter may be connected to terminals 12 of Fig. 1 while the voltage terminals of the wattmeter may be connected to the terminals 13 of Fig. 1. A family of curves are obtained by setting the phase control dial at a fixed value and varying the frequency throughout the range of interest. At a number of discrete frequency points the wattmeter is read and the wattmeter readings thus obtained are plotted against frequency. The phase control dial 10 is then adjusted to another phase relation and a similar series of wattmeter readings obtained throughout the frequency range of interest. This is repeated until data for a whole family of curves are obtained which will constitute the frequency-phase characteristic of the wattmeter. Other uses of this invention will be apparent to those skilled in this art.

Figure 4:
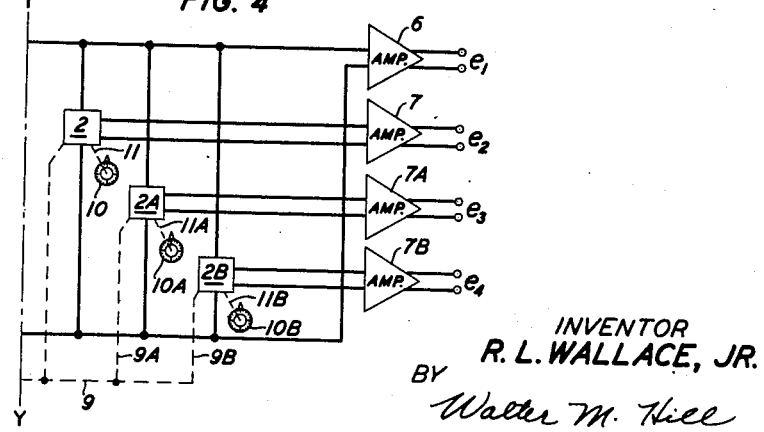
Fig. 4 illustrates a modification of Fig. 1 showing how additional voltages, each independently adjustable as to phase, may be derived.

Occasionally it is convenient to have more than two voltages of the same frequency displaced by any desired arbitrary phase angles. An arrangement suitable for providing these voltages is shown in Fig. 4. It is evident that if the oscillator 1 of Fig. 1 is separated from the phase shift network 2 at the line Y—Y and the circuit of Fig. 4 added to the oscillator 1, a plurality of output voltages $e_1$, $e_2$, $e_3$ and $e_4$ may be obtained in the same manner as already described for Fig. 1. In Fig. 4 it will be noted that the phase shift network 2 of Fig. 1 is shown in block outline with its phase control dial 10 coupled thereto through the mechanical linkage 11. The mechanical linkage 9 is extended by way of links 9A and 9B to each of additional phase control networks 2A and 2B, each identical in structure with phase shift network 2. These two networks are thereby simultaneously corrected for phase shift as the frequency of oscillator 1 is varied. The phases of their output voltages $e_3$ and $e_4$ may be independently adjusted by means of their phase control dials 10A and 10B. The outputs from the phase shift networks 2A and 2B may be amplified by amplifiers 7A and 7B, respectively. If additional voltages are desired they may be obtained in the same manner by simply adding additional phase shift networks as shown in Fig. 4.

Instead of using the arrangement of Fig. 4, additional voltages can be obtained by utilizing the Scott transformer connection principle. For example, assume that voltages $e_1$ and $e_2$ of Fig. 1 are adjusted to a 90-degree phase difference. This is the usual relationship for a two-phase power circuit. Now by simply connecting the two-phase terminals of a conventional Scott transformer to terminals 12 and 13 a three-phase output may be obtained from the Scott transformer. This is purely conventional and requires no further detailed description. The three voltages may be shifted in phase with respect to each other by simply adjusting the relative amplitudes and signs of the two voltages $e_1$ and $e_2$ applied to the input of the Scott transformer. Additional voltages may be similarly derived. In every case, however, the frequency may be varied without shifting the phase by reason of the mechanical coupling between resistors R of the oscillator 1 and the resistors $R_1$ of the phase shift network 2.

What is claimed is:

1. A source of variable frequency polyphase alternating current having mutually independent frequency and phase-adjusting means comprising an oscillator with variable frequency-determining elements of resistance and reactance only and an output circuit, at least one variable phase-adjusting network connected to said oscillator output circuit, an output circuit for said network, at least two kinds of phase-varying elements in said network, mechanical means coupling the frequency-determining elements with one of the kinds of phase-varying elements whereby the frequency may be varied independent of the phase between the voltages from said output circuits, and means for adjusting others of the remaining phase-varying elements to vary the phase between said voltages independent of frequency.

2. A source of variable frequency polyphase alternating current having mutually independent frequency and phase-adjusting means comprising a variable frequency oscillator with an output circuit for supplying an output voltage, frequency-determining elements in said oscillator including a resistance means and a reactance, at least one of which is variable to vary the frequency, means for adjusting said variable frequency-determining means, a variable phase-adjusting means connected to the oscillator output circuit and having an output circuit means for supplying at least one output voltage, variable resistance elements and variable reactance elements included in said phase-adjusting means and means for independently adjusting each, and a means coupling said variable frequency-adjusting means and some of the variable elements of said phase-adjusting means for simultaneous operation whereby the frequency may be varied without changing the phase relations of the voltages in said oscillator output circuit and in said phase-adjusting output circuit means, and whereby the remaining elements of the phase-adjusting means may be varied to change said phase relation independent of frequency.

3. A source of variable frequency polyphase alternating current having mutually independent frequency and phase-adjusting means comprising a variable frequency oscillator with an output circuit for supplying an output voltage, frequency-determining elements in said oscillator comprising fixed capacitors and ganged variable resistors the latter being so constructed and arranged as to vary the oscillator frequency, means for adjusting the ganged resistors, a variable phase-adjusting means connected to the oscillator output circuit and having an output circuit means for supplying a second output voltage, ganged variable resistors and separately ganged variable capacitors, included in said phase-adjusting means, and means for independently adjusting each, and means for operating one of said last-named adjusting means simultaneously with the adjusting means in said oscillator whereby the frequency may be varied without affecting the phase relation between said output voltages.

4. The combination of claim 3 and means for adjusting the other of said last-named adjusting means for shifting the phase of said second output voltage.

5. A source of variable frequency polyphase alternating current having phase relations independent of frequency adjustments, said source comprising a variable frequency oscillator with an output circuit for supplying an output voltage, variable frequency-determining elements of resistance and reactance only in said oscillator, means for adjusting said variable frequency elements, a phase-shifting network connected to the oscillator output circuit and including variable phase compensating elements, means for adjusting said variable elements, output circuits for said network for supplying a voltage of phase different from that of the oscillator output voltage, and means for operating said last-named means simultaneously with said variable frequency adjusting means whereby the phase relations of said output voltages are unaffected by said frequency-adjusting means.

6. A source of variable frequency polyphase alternating current having phase relations independent of frequency adjustment, said source comprising a variable frequency oscillator with an output circuit supplying an output voltage, variable frequency-determining elements of resistance and reactance only in said oscillator, means for adjusting said variable frequency elements, a phase-shifting network connected to the oscillator output circuit and including variable impedance elements, means for adjusting said variable elements, output circuits for said network for supplying a voltage of phase different from that of the oscillator output voltage, and means for operating said last-named adjusting means simultaneously with said variable frequency-adjusting means whereby the phase relations of said output voltages are unaffected by said frequency-adjusting means.

7. The combination of claim 6 wherein the variable impedance elements in said phase-shifting network comprise variable resistors.

8. The combination of claim 6 wherein the variable impedance elements in said phase-shifting network comprise variable capacitors.

ROBERT L. WALLACE, Jr.

References Cited in the file of this patent

UNITED STATES PATENTS

| Number | Name | Date |
|---|---|---|
| 2,268,872 | Hewlett | Jan. 6, 1942 |
| 2,342,708 | Usselman | Feb. 29, 1944 |
| 2,451,858 | Mork | Oct. 19, 1948 |
| 2,463,073 | Webb | Mar. 1, 1949 |
| 2,554,164 | Wojciechowski | May 22, 1951 |

OTHER REFERENCES

Brode, abstract of application Serial Number 784,984, published January 3, 1950. (Copy in 250—36—13.2B.)